United States Patent [19]

Aono

[11] 4,148,379
[45] Apr. 10, 1979

[54] BRAKE SHOE CLEARANCE ADJUSTING DEVICE

[75] Inventor: Masami Aono, Yokohama, Japan

[73] Assignee: Tokico Ltd., Kawasaki, Japan

[21] Appl. No.: 881,894

[22] Filed: Feb. 27, 1978

[30] Foreign Application Priority Data

Feb. 28, 1977 [JP] Japan ................................. 52-21029

[51] Int. Cl.² ...................... F16D 51/22; F16D 65/40
[52] U.S. Cl. .......................... 188/79.5 P; 188/196 BA; 192/111 A
[58] Field of Search ................... 188/79.5 GE, 79.5 K, 188/79.5 S, 79.5 P, 79.5 R, 196 BA, 216; 192/111 A

[56] References Cited

U.S. PATENT DOCUMENTS

| | | | |
|---|---|---|---|
| 2,337,069 | 12/1943 | Spiller et al. | 188/79.5 R X |
| 3,111,200 | 11/1963 | Gores | 188/196 BA X |
| 3,963,100 | 6/1976 | Kaub | 188/196 BA X |
| 4,061,211 | 12/1977 | Hoshino et a. | 188/79.5 P |

Primary Examiner—George E. A. Halvosa
Attorney, Agent, or Firm—Wenderoth, Lind & Ponack

[57] ABSTRACT

A brake shoe clearance adjusting device in an internal shoe drum brake including a pair of arcuate brake shoes, and a strut of adjustable length extending between the brake shoes and consisting a first strut part, a second strut part having male screw-thread portion thereon at least a part of which being received slidably in a tubular portion of the first strut part, and an adjusting nut engaging screw-thread portion of the second strut part and abutting with the first strut part, wherein a retaining member extends between one of brake shoes and one end of the strut and engages with one end of a shoe return spring whereby a portion of the force of the shoe return spring acts to pull the strut bodily toward the other brake shoe.

3 Claims, 4 Drawing Figures

BRAKE SHOE CLEARANCE ADJUSTING DEVICE

BACKGROUND OF THE INVENTION

The present invention relates to brake shoe clearance adjusting device in internal shoe drum brakes.

One of conventional internal shoe drum brakes comprises, as shown, for example, in British Pat. No. 1199191 and No. 1274844, a pair of arcuate brake shoes movably mounted on a stationary brake structure, power actuated service brake means for expanding the shoes against the drum, auxiliary, mechanical brake actuating means including an actuating lever engaging with one shoe and a strut for transmitting auxiliary brake actuating force to the other shoe. The strut includes a first strut part having a tubular portion, a second strut part having male screw-threaded portion at least a portion of which being inserted into the tubular portion of the first strut part displaceably, and an adjusting nut engaging with the male screw-threaded portion of the second strut part and abutting with the open end of the tubular portion of the first strut part and having, usually, ratchet teeth formed on its outer periphery. The length of the strut is adjusted by rotating the adjusting nut on the second strut part to compensate the wear of brake shoes. The abutment of the adjusting nut with the first strut part is, usually, maintained by a shoe return spring extending between the brake shoes.

In the shoe drum brake of the aforementioned type, there is shortcomings such that, when it is intended to effect the adjustment in releasing the mechanical brake actuating means the biassing force of the return spring will not sometimes act on the strut under the reasons that the brake shoes will not return quickly to the retracted position by such as the resistance of hydraulic pistons in power actuated service brake means or the like, thereby the adjusting nut will separate from the open end of the tubular portion of the first strut part, and the rotational resistance of the adjusting nut on the second strut part will decrease substantially, as the results, the rotational direction of the adjusting nut cannot be controlled unitary and the adjustment of the shoe clearance cannot be effected reliably since the adjusting nut may sometimes be rotated in the reverse direction (in the direction contracting the effective length of the strut).

Further, when the biassing force of the shoe return spring does not act on the strut comprising a first and second strut parts, the position of the strut in the shoe drum brake cannot be maintained properly thereby causing rattling noise and undesirable wear of related parts.

BRIEF SUMMARY OF THE INVENTION

An object of the present invention is to overcome these shortcomings and, in accordance with the invention, a retaining member is disposed to extend between one end of the strut and one of brake shoes associated therewith, and the shoe return spring is arranged to act between the retaining member and the other brake shoe, whereby at least a portion of the force of the return spring acts on the strut permanently and the separation of the adjusting nut from the first strut part is prevented reliably.

BRIEF DESCRIPTION OF THE DRAWINGS

The objects and advantages of the present invention will become apparent from the following description taken in conjunction with the drawings, in which.

Figure 1:
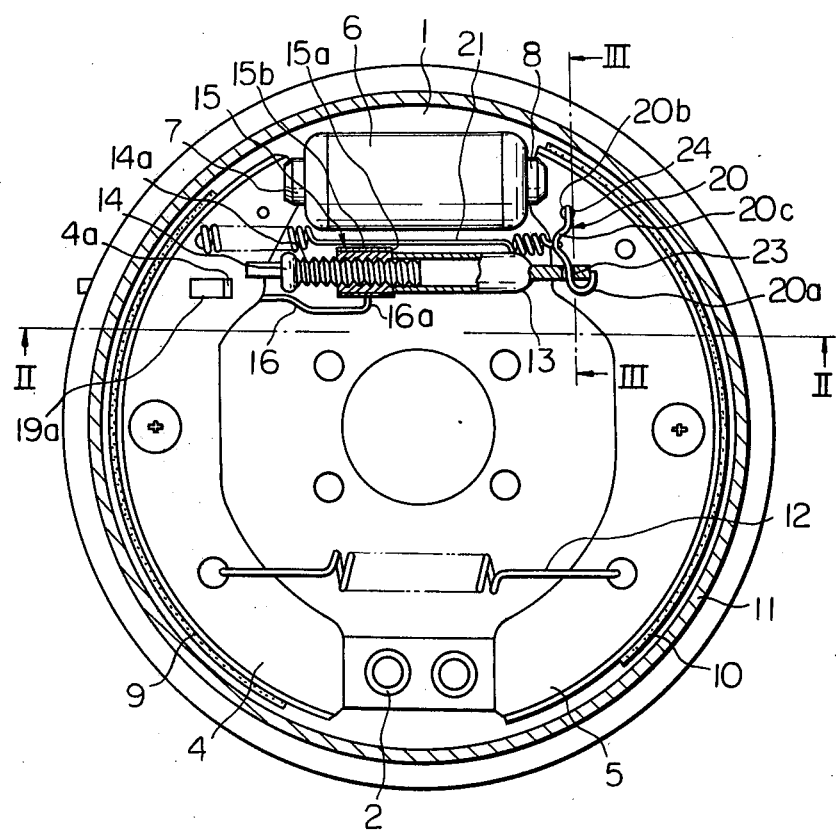
FIG. 1 is a side elevational view of an internal shoe drum brake according to the present invention.
Figure 2:
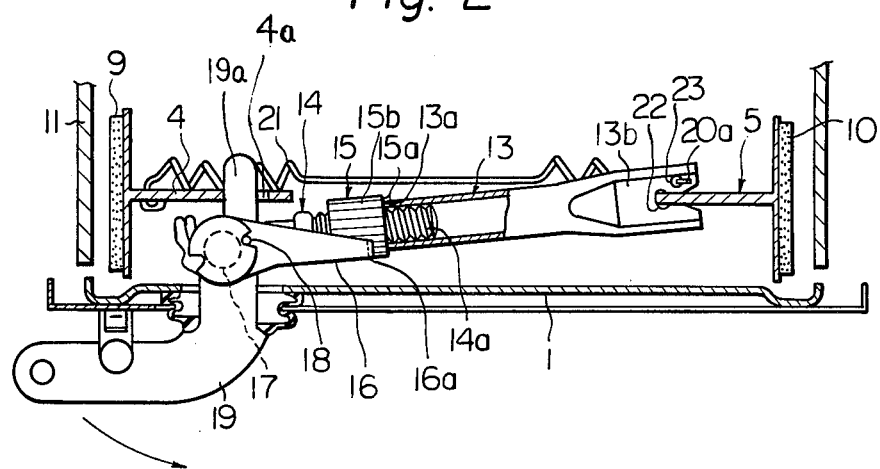
FIG. 2 is a cross-sectional view taken along the line II—II in FIG. 1.

The internal shoe drum brake shown in FIGS. 1 and 2 comprises a backplate 1 having an anchor 2 secured thereon, a pair of arcuate brake shoes 4 and 5, one ends of which being mounted rotatably on the anchor 2 respectively. The other ends of the brake shoes 4 and 5 engages respectively with pistons 7 and 8 of a hydraulic cylinder 6 constituting power actuated service brake means. When the pistons 7 and 8 extend out of the cylinder the brake shoes 4 and 5 are expanded against the force of shoe return springs 12 and 21, and brake linings 9 and 10 attached respectively on the shoes 4 and 5 are pressed against the inner surface of a brake drum 11 in well known manner. The shoe return spring 12 is disposed at a position adjacent to the anchor 2 as shown in FIG. 1.

There provided means for adjusting the wear of the lining 9 or 10 to maintain clearance between the brake drum 11 and the linings 9 and 10 not to exceeds a predetermined value, and auxiliary mechanical brake actuating means. In the embodiment shown in the drawings, such means comprises a strut formed of a first strut part 13 and a second strut part 14, an adjusting nut 15, an adjusting lever 16, a supporting shaft 17, a coil spring 18, a hand brake lever 19, a retaining member 20, and the shoe return spring 21. One end 19a of the hand brake lever 19 is fitted in an opening 4a of the brake shoe 4. The supporting shaft 17 is mounted integrally on the hand brake lever 19, and one end of the second strut part 14 is rotatably fitted on the shaft 17. The adjusting lever 16 is mounted rotatably on the shaft 17 and receives the torsional force and compressive force of the coil spring 18 which is mounted also on the shaft 17.

Male screw-threaded portion 14a is formed on the other end portion of the second strut part 14 and is received in a tubular portion of the first strut part displaceably so as to enter or exit freely, but the movement of the second strut part into the first strut part is restricted by the adjusting nut 15 engaging screw-threadingly with the male screw-threaded portion 14a of the second strut part with one side surface 15a abutting with the open end 13a of the first strut part 13. A pawl 16a formed on the adjusting lever 16 engages with ratchet teeth 15b formed on the outer periphery of the adjusting nut 15. It will be noted that there is a predetermined play between the pawl 16a and a tooth of the ratchet teeth 15b which corresponds to the normal brake shoe clearance.

Figure 3:
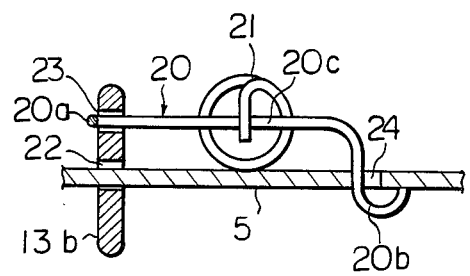
FIG. 3 is an enlarged cross-sectional view taken along the line III—III in FIG. 1.

In a fork portion 13b formed on the end opposite to the open end 13a of the first strut part there provided an axially extending cutout 22 to receive the web of the brake shoe 5 loosely and engages with a knotch formed in the web so as to allow rocking movement of the brake shoe in its expanding direction. Further, according to the present invention, a through hole 23 is formed in the fork portion 13b of the first strut part as shown in FIGS. 2 and 3 to receive one end 20a of the retaining member 20 having the form of a wire rod. The other end 20b of the retaining member 20 is received in a through hole 24 (FIGS. 1 and 3) formed in the web of the brake shoe 5. The shoe return spring 21 extends between the brake shoe 4 and the central portion 20c of the retaining member 20 which is bent into a generally V-shaped form as shown in FIG. 1 to locate generally hook-shaped end of the return spring 21.

Thus, the shoe return spring 21 acts to pull the brake shoes 4 and 5 inwardly and also acts to urge the first and second strut parts 13 and 14 toward each other whereby the end surface 15a of the adjusting nut 15 is pressed against the open end 13a of the first strut part. The ratio between the force acting on the strut and the force acting on the brake shoe 5 can be changed as desired. Since the retaining member is formed of a resilient material and the opposite end portions 20a and 20b are inserted loosely in the holes 23 and 24 respectively, there is not any impediments in the normal expanding or retracting movement of the brake shoes 4 and 5, and a portion of spring force of the return spring 21 acts permanently on the first and second strut parts 13 and 14.

The inward or retracting movement of the brake shoes 4 and 5 caused by shoe return springs 12 and 21 is restricted by the engagement of the brake shoe 4 with one end 19a of the hand brake lever 19 and the engagement of the first strut part 13 with the brake shoe 5.

In operation, when the hand brake lever 19 is rotated in the arrow direction in FIG. 2 around the supporting shaft 17, by operating manual brake actuating lever or the like (not shown) which is connected to the lever 19 through a cable or the like, the brake shoes 4 and 5 displace in the expanding direction and the adjusting lever 16 rotates around the shaft 17. Assuming that the linings 9 and 10 have worn such that the brake shoe clearance exceeds a predetermined value, then, the hand brake lever 19 will rotate over a predetermined amount, and the pawl 16a of the adjusting lever 16 moves exceeding the aforementioned play to rotate the adjusting nut 15. In releasing hand brake lever 19, the pawl 16a of the adjusting lever 16 returns to the original position without rotating the adjusting nut in the reverse direction and with picking another tooth of the ratchet teeth 15b.

The adjusting nut 15 will rotate by an amount corresponding to one tooth of the ratchet teeth so as to displace along the male screw-thread portion 14a of the second strut part 14 rightwardly as viewed in FIG. 1 thereby projecting the second strut part 14 from the first strut part 13, as the result, the total length of the strut consisting of the first and second strut parts is increased. The amount of the adjusting movement or the amount of displacement of the nut 15 on the second strut part 14 is determined by the number or the pitch of the ratchet teeth 15b and the pitch of the screw-thread portion 14a of the second strut part 14. Therefore, by determining the amount of this adjusting movement equal to the maximum permissible amount of increase in the shoe clearance caused by the wear of brake shoes, it is possible to adjust the shoe clearance automatically by applying the hand brake thus maintaining the shoe clearance properly.

Since the shoe return spring 21 acts to urge the end surface 15a of the adjusting nut 15 against the open end 13a of the first strut part 13 permanently, some amount of rotational resistance acts permanently on the adjusting nut 15. Therefore, the adjusting nut 15 will not rotate in the reverse direction even when the pawl 16a of the adjusting lever 16 returns along the teeth of the ratchet teeth 15b to pick up a new tooth. Namely, the pawl 16a of the adjusting lever 16 will return along the outer circumference of the adjusting nut 15 in the return movement of the adjusting lever 16 when the adjusting lever has been rotated exceeding the predetermined amount to rotate the adjusting nut 15 by the pawl 16a thereof in applying brake, the sliding resistance acting between the ratchet teeth 15b and the pawl 16a in the return movement of the adjusting lever 16 is not sufficiently large to rotate the adjusting nut 15 against the rotational resistance acting between the adjusting nut 15 and the first strut part 13 and, therefore, when the shoe clearance has been adjusted automatically by the rotating movement of the adjusting lever in the brake applying direction, the pawl 16a of the adjusting lever will reliably engage with the next tooth of the ratchet teeth in its return movement and the adjusted shoe clearance can be maintained reliably.

Figure 4:
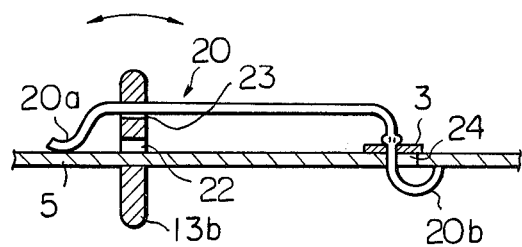
FIG. 4 is a view similar to FIG. 3 but showing a modified form.

FIG. 4 shows a second embodiment of the present invention, wherein one end 20a of the retaining member 20 is bent downward after passing through the hole 23 in the first strut part 13, and the other end 20b of the retaining member 20 is prevented from the movement in the direction downward in FIG. 4 by providing such as a ring 24 or the like being secured to the retaining member 20, whereby, the first strut part 13 is oriented in the vertical direction as viewed in FIG. 4. Namely, the length of a portion of the one end 20a being bent downwardly is determined larger than the distance between the upper surface of the web of the brake shoe 5 and the upper end of the hole 23 formed in the fork portion 13b of the first strut part 13 when the lower side surface of the cutout 22 in the fork portion 13b engage with the lower surface of the web of the brake shoe 5, whereby, the fork portion 13b of the first strut part 13 is oriented in the vertical direction in the drawing.

Therefore, the rocking movement of the first strut part 13 in the arrow directions in FIG. 4 can be prevented, and adjusting movement of the adjusting nut will be effected precisely. It will be understood that such rocking movement preventing function can be obtained by increasing the breadth of the fork portion 13a of the first strut part 13 (in the sidewise direction in FIG. 4) and decreasing the width of the cutout 22 of the brake shoe 5 (in the vertical direction in FIG. 4) receiving the fork portion 13a therein.

In the embodiments, the retaining member 20 is formed of a wire rod, however, it will be understood that the retaining member may be formed of any suitable materials with any suitable configurations provided that the retaining member can transmit the pulling force of the shoe return spring on the brake shoe 5 and on the first strut part 13 by dividing the force so as to urge permanently the open end 13a of the first strut part against the end surface 15a of the adjusting nut, and that the retaining member does not obstruct the movement of the brake shoe 5 in the expanding direction. Further, the adjusting member 16 in the embodiments is associated with mechanical brake actuating mechanism, but the adjusting lever may be formed as a generally L-shaped member with one arm of which being connected to the other shoe 4 so that the brake shoe clearance adjusting function is effected each time when the brake shoes are expanded and contracted by hydraulic pistons 7 and 8. Further, the adjusting function may be effected when the brake shoes moves inward which is opposite of the embodiments.

As described heretofore in detail, it is possible to adjust the brake shoe clearance reliably according to the present invention, since a part of the force of a shoe return spring is divided by the retaining member so as to urge one end surface of the adjusting nut engaging screw-threadingly on the male screw-thread portion of second strut part against the open end of the tubular first strut part permanently by the divided force of the shoe return spring, whereby a suitable rotational resistance will act permanently on the adjusting nut, thus preventing the reverse rotation thereof.

Further, since the divided force of the shoe return spring acts permanently on the strut consisting of first and second strut parts to urge it in one direction, thus, the strut is located positively in the brake, and excess play between the brake shoe and the strut and the rattling noise caused therefrom can be omitted.

Further, the present invention may easily be applied to current shoe drum brakes by a slight modification since the force of usual shoe return spring is, according to the present invention, utilized to urge the adjusting nut against the first strut part by adding simply the retaining member.

What is claimed is:

1. A brake shoe clearance adjusting device in an internal shoe drum brake including a strut consisting of a first strut part, a second strut part having male screw-thread portion at least a part of which being received slidably in a tubular portion of the first strut part, and an adjusting nut engaging with the male screw-thread portion of the second strut part and engaging with first strut part, said strut being disposed to extend between a pair of arcuate brake shoes, said adjusting nut being rotated when brake shoe clearance exceeds a predetermined value so as to extend the second strut part from the first strut part, wherein there is disposed a retaining member with one end thereof engaging with one of the brake shoes and the other end thereof engaging with one end of the strut, and a return spring extends between the other brake shoe and the central portion of the retaining member.

2. A brake shoe clearance adjusting device as set forth in claim 1 wherein the retaining member is formed of a wire rod, one end of which passes through a hole formed in a fork-shaped end of the first strut part engaging with the web of one of the brake shoes, the other end of the wire rod is retained on said web of said one brake shoe, and the central portion of the wire rod engages with one end of said shoe return spring.

3. A brake shoe clearance adjusting device as set forth in claim 2 wherein one end of the retaining member passing through the hole formed in the fork-shaped end of the first strut part extends further to abut with said web of said one brake shoe so that the fork-shaped portion of the first strut part is oriented vertically with respect to the plane of said web.

* * * * *